(12) United States Patent
Han et al.

(10) Patent No.: US 8,330,918 B2
(45) Date of Patent: Dec. 11, 2012

(54) METHOD OF MANUFACTURING A LIQUID CRYSTAL DISPLAY AND LIQUID CRYSTAL DISPLAY THEREOF

(75) Inventors: Hye-Rim Han, Seongnam-si (KR); Si Hyun Ahn, Cheonan-si (KR); Ji-Hyeon Son, Seongnam-si (KR); Kyung-Suk Jung, Iksan-si (KR)

(73) Assignee: Samsung Display Co., Ltd. (KR)

( * ) Notice: Subject to any disclaimer, the term of this patent is extended or adjusted under 35 U.S.C. 154(b) by 218 days.

(21) Appl. No.: 12/985,480

(22) Filed: Jan. 6, 2011

(65) Prior Publication Data

US 2011/0216261 A1 Sep. 8, 2011

(30) Foreign Application Priority Data

Mar. 3, 2010 (KR) ........................ 10-2010-0018887

(51) Int. Cl.
*G02F 1/1343* (2006.01)
(52) U.S. Cl. ....................................................... 349/139
(58) Field of Classification Search .................. 349/139
See application file for complete search history.

(56) References Cited

U.S. PATENT DOCUMENTS

| | | |
|---|---|---|
| 2008/0024690 A1 | 1/2008 | Hirakata et al. |
| 2008/0143937 A1 | 6/2008 | Nakagawa et al. |
| 2008/0273131 A1* | 11/2008 | Kim .............................. 349/38 |
| 2009/0103035 A1* | 4/2009 | Suzuki et al. ................. 349/141 |
| 2010/0110357 A1* | 5/2010 | Tasaka et al. ................. 349/130 |
| 2011/0037915 A1* | 2/2011 | Tasaka et al. .................. 349/39 |

FOREIGN PATENT DOCUMENTS

| | | |
|---|---|---|
| JP | 2004-093654 A | 3/2004 |
| JP | 2004-109512 A | 4/2004 |
| JP | 2007-072116 A | 3/2007 |
| JP | 2007-225828 A | 9/2007 |
| JP | 2008-501127 A | 1/2008 |
| KR | 1020040039986 A | 5/2004 |
| KR | 1020070068195 A | 6/2007 |
| KR | 1020070074998 A | 7/2007 |
| KR | 1020080083747 A | 9/2008 |
| KR | 1020090046540 A | 5/2009 |

* cited by examiner

*Primary Examiner* — Sung Pak
(74) *Attorney, Agent, or Firm* — Cantor Colburn LLP

(57) ABSTRACT

A liquid crystal display ("LCD") includes a first insulation substrate, a thin film transistor ("TFT") disposed on the first insulation substrate, and a pixel electrode disposed on the first insulation substrate and connected to a drain electrode of the TFT, wherein the pixel electrode includes an edge connection and a drain electrode connection, a portion of the edge connection pattern near a position where the drain electrode connection and the edge connection intersect is removed in the LCD, the pixel electrode further includes a stem and a plurality of minute branches, and a laser is irradiated to one intersection point between the stem and the minute branches among the stem near the light blocking layer to cut the portion of the pixel electrode.

12 Claims, 7 Drawing Sheets

METHOD OF MANUFACTURING A LIQUID CRYSTAL DISPLAY AND LIQUID CRYSTAL DISPLAY THEREOF

This application claims priority to Korean Patent Application No. 10-2010-0018887, filed on Mar. 3, 2010, and all the benefits accruing therefrom under 35 U.S.C. §119, the content of which in its entirety is herein incorporated by reference.

BACKGROUND OF THE INVENTION (a) Field of the Invention

The present invention relates to a manufacturing method of a liquid crystal display ("LCD"), and an LCD manufactured thereby. More particularly, the present invention relates to a manufacturing method of an LCD including a feature to repair a pixel defect in a minute branch pixel electrode structure which would otherwise result in an unwanted turned-on pixel when the LCD received instructions to display a black screen, and an LCD manufactured by the method.

(b) Description of the Related Art

Among display panels, an LCD is one type of flat panel display which is currently being widely used, and includes two display panels in which field generating electrodes such as a pixel electrode and a common electrode, etc., are formed, and a liquid crystal layer is disposed therebetween. The two display panels of the liquid crystal display typically include a thin film transistor ("TFT") array panel and a common electrode panel, respectively, and a pixel electrode of the TFT array panel and a common electrode of the common electrode panel are applied with voltages to generate an electric field in the liquid crystal layer disposed therebetween, and thus orientation directions of liquid crystal molecules of the liquid crystal layer are determined by the applied voltages and polarization of incident light is controlled by the liquid crystal molecules so as to display an image.

The TFT array panel typically includes signal lines such as a gate wire and a data wire, a transparent pixel electrode, a color filter, and a black matrix, and the common electrode panel typically includes a common electrode. Alternatively, the color filter and the black matrix may be formed in the common electrode panel.

Among the various types of LCDs, a normally black mode vertical alignment ("VA") mode display displays a black image when a voltage difference between two display panels is zero.

Various display defects of the LCD can occur, and a pixel defect in which a pixel is turned on, e.g., allows light from a backlight to pass therethrough to be perceived by a viewer, when the LCD is instructed to display a black image is a representative defect. This defect will hereinafter be referred to as a pixel shining during a black screen image for brevity of explanation.

To repair the pixel defect in which the pixel shines during the black screen image, even if the defect occurs among several unit pixels of the LCD, a drain electrode connection of a TFT of the defective pixel is typically cut by a laser so that the drain electrode and pixel electrode of the defective pixel are not applied with a data voltage, and thereby the pixel electrode is electrically floated and the voltage difference between the pixel electrode and the common electrode disappears, and as a result the black state is always maintained.

However, in the case of a conventional minute branch pixel electrode structure, a portion of the drain electrode connection and the edge connection is covered by a light blocking layer to prevent a light leakage phenomenon such that it is impossible to irradiate a laser onto the drain electrode, i.e., the laser would be blocked by the light blocking layer, and thereby it is difficult to repair the pixel defect.

Also, due to this problem, although the portion of the drain electrode that is not covered by the light blocking layer may be irradiated by the laser for cutting, the data voltage may still be applied to the pixel electrode through the edge connection, and thereby the pixel defect is not repaired.

BRIEF SUMMARY OF THE INVENTION

The present invention easily repairs a pixel defect in which a pixel shines during a black screen image. The present invention provides an improvement over a minute branch pixel electrode structure in which the drain electrode is covered by a light blocking layer such that the repair is impossible through a conventional pixel defect repair method.

In the present invention, a portion of an edge connection pattern near the position where the edge connection pattern and a drain electrode connection intersect is removed from a pixel electrode.

An exemplary embodiment of a liquid crystal display ("LCD") according to the present invention includes; a first insulation substrate, a thin film transistor ("TFT") disposed on the first insulation substrate, and a pixel electrode disposed on the first insulation substrate and connected to a drain electrode of the TFT, wherein the pixel electrode includes a plurality of minute branches, a stem which connects the plurality of minute branches, an edge connection which connects the plurality of minute branches, and a drain electrode connection which connects the stem and the drain electrode of the TFT, wherein the edge connection extends in a direction substantially perpendicular to the drain electrode connection, and includes two portions separated from opposing sides of the drain electrode connection such that a gap having a predetermined size is disposed between the two portions and the drain electrode connection.

Another exemplary embodiment of an LCD according to the present invention includes; a first insulation substrate, a TFT disposed on the first insulation substrate, a pixel electrode disposed on the first insulation substrate and connected to a drain electrode of the TFT, and a light blocking layer which covers the TFT, wherein the pixel electrode includes; a drain electrode connection connected to a drain electrode of the TFT, a stem connected to the drain electrode connection, and a plurality of minute branches which extend from the stem in a diagonal direction, wherein the drain electrode connection includes at least one outer line which forms an only passage between a remaining portion of the pixel electrode and the TFT and is disposed in a region not covered by the light blocking layer.

An exemplary embodiment of a manufacturing method of an LCD according to the present invention includes; providing a TFT array panel including; a first insulation substrate, a TFT disposed on the first insulation substrate, and a pixel electrode disposed on the first insulation substrate and connected to a drain electrode of the TFT, wherein the pixel electrode includes a plurality of minute branches, a stem which connects the plurality of minute branches, an edge connection which connects the plurality of minute branches, and a drain electrode connection which connects the stem and the drain electrode of the TFT, wherein the edge connection extends in a direction substantially perpendicular to the drain electrode connection, and includes two portions separated from opposing sides of the drain electrode connection such that a gap having a predetermined size is disposed between the two portions and the drain electrode connection; and irradiating a laser to a region corresponding to the portion of the drain electrode connection disposed in a region not covered by the light blocking layer to disconnect the drain electrode connection.

Another exemplary embodiment of a manufacturing method of an LCD according to the present invention includes; providing a TFT array panel including a first insulation substrate, a TFT disposed on the first insulation substrate, a pixel electrode disposed on the first insulation substrate and connected to a drain electrode of the TFT, and a light blocking layer covering the TFT, wherein the pixel electrode includes; a drain electrode connection connected to a drain electrode of the TFT, a stem connected to the drain electrode connection, and a plurality of minute branches which extend from the stem in a diagonal direction, wherein the drain electrode connection includes at least one outer line which forms an only passage between a remaining portion of the pixel electrode and the TFT and is disposed in a region not covered by the light blocking layer, and irradiating a laser to a region corresponding to the portion of the drain electrode connection disposed in a region not covered by the light blocking layer to disconnect the drain electrode connection for a pixel defect repair.

In the present exemplary embodiments, a shape and configuration of the drain electrode connection may be variously changed.

In the present invention, in the structure of the minute branch pixel electrode where the portions of the edge connection pattern near the position where the edge connection and the drain electrode connection would otherwise intersect each other is removed, instead of attempting to irradiate a drain electrode which would be obscured by the light blocking layer, the laser is irradiated to the longitudinal stem where the light is not blocked by the light blocking layer such that the laser cut is possible, and the data voltage is not applied to the pixel electrode through the edge connection after the cutting, and thereby the pixel defect may be repaired.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Now, an exemplary embodiment of a liquid crystal display ("LCD") according to the present invention will be described with reference to FIG. 1 to FIG. 5.

Figure 1:
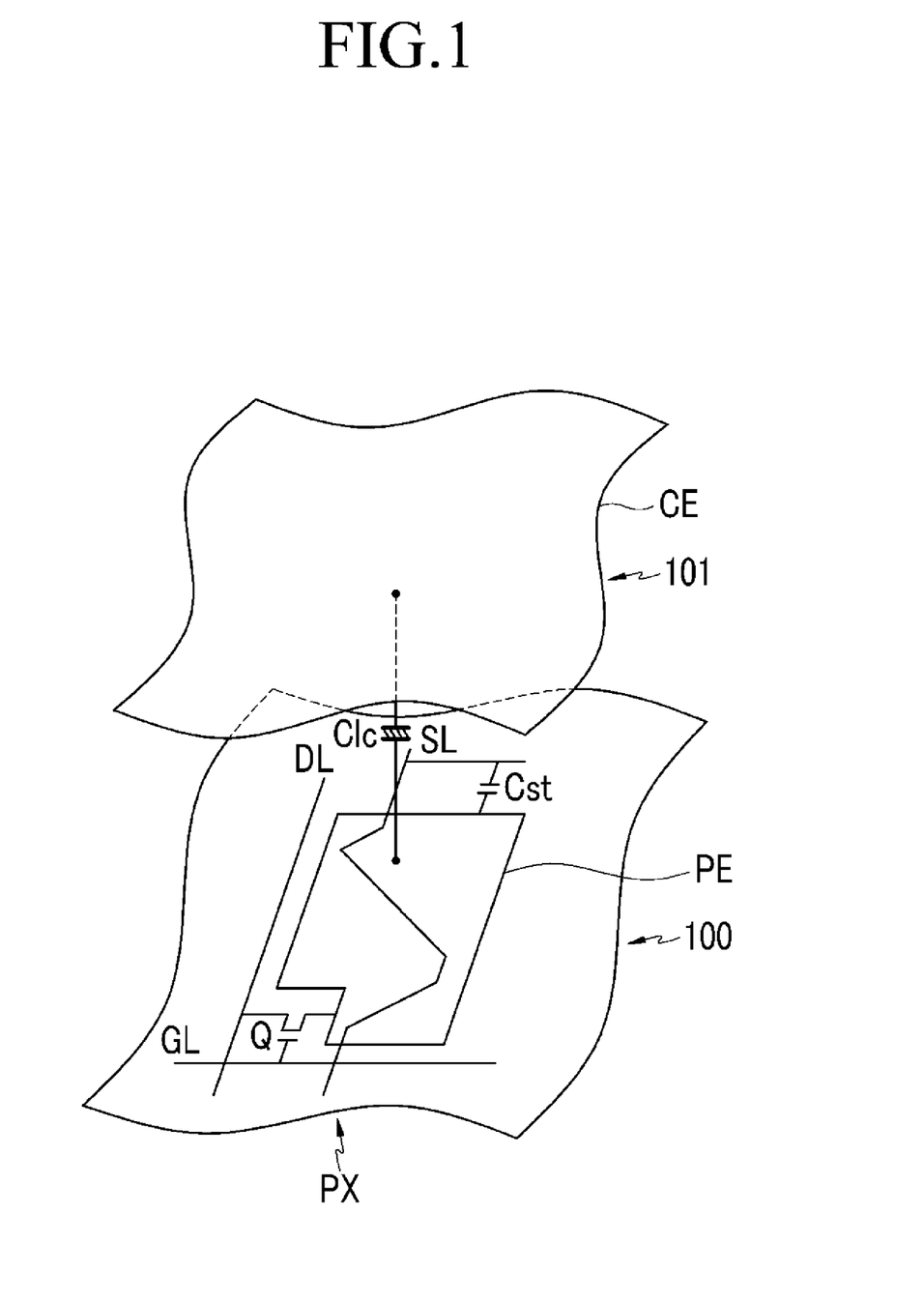
FIG. 1 is a schematic circuit diagram of an exemplary embodiment of a liquid crystal display ("LCD") according to the present invention.

FIG. 1 is a schematic circuit diagram of an exemplary embodiment of a pixel in an exemplary embodiment of an LCD according to the present invention.

The LCD includes a thin film transistor ("TFT") array panel 100 and a common electrode panel 101 that are disposed substantially opposite to each other, the TFT array panel 100 includes various signal lines such as a gate line GL and a data line DL, a TFT Q and a pixel electrode PE, and the common electrode panel 101 includes a common electrode CE.

Figure 2:
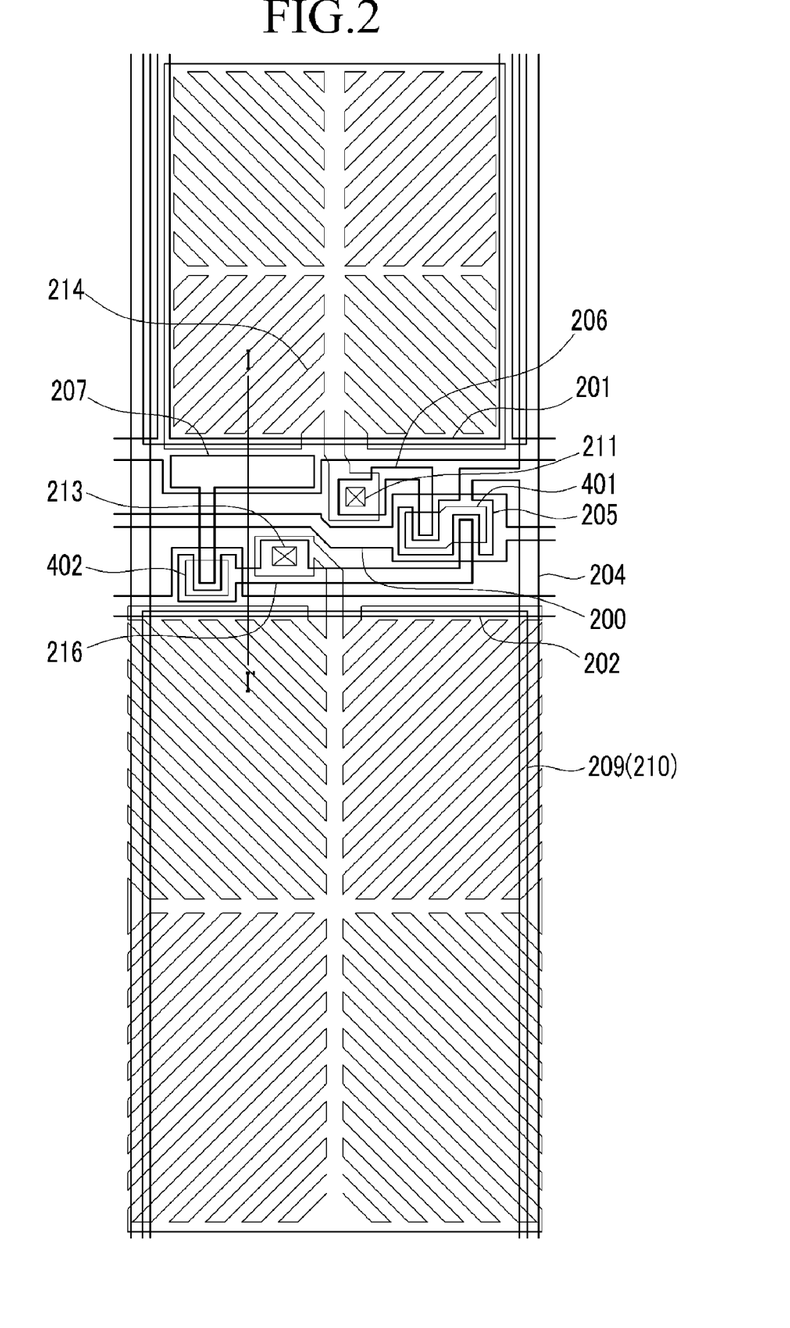
FIG. 2 is a top plan view of an exemplary embodiment of an LCD according to the present invention.
Figure 3:
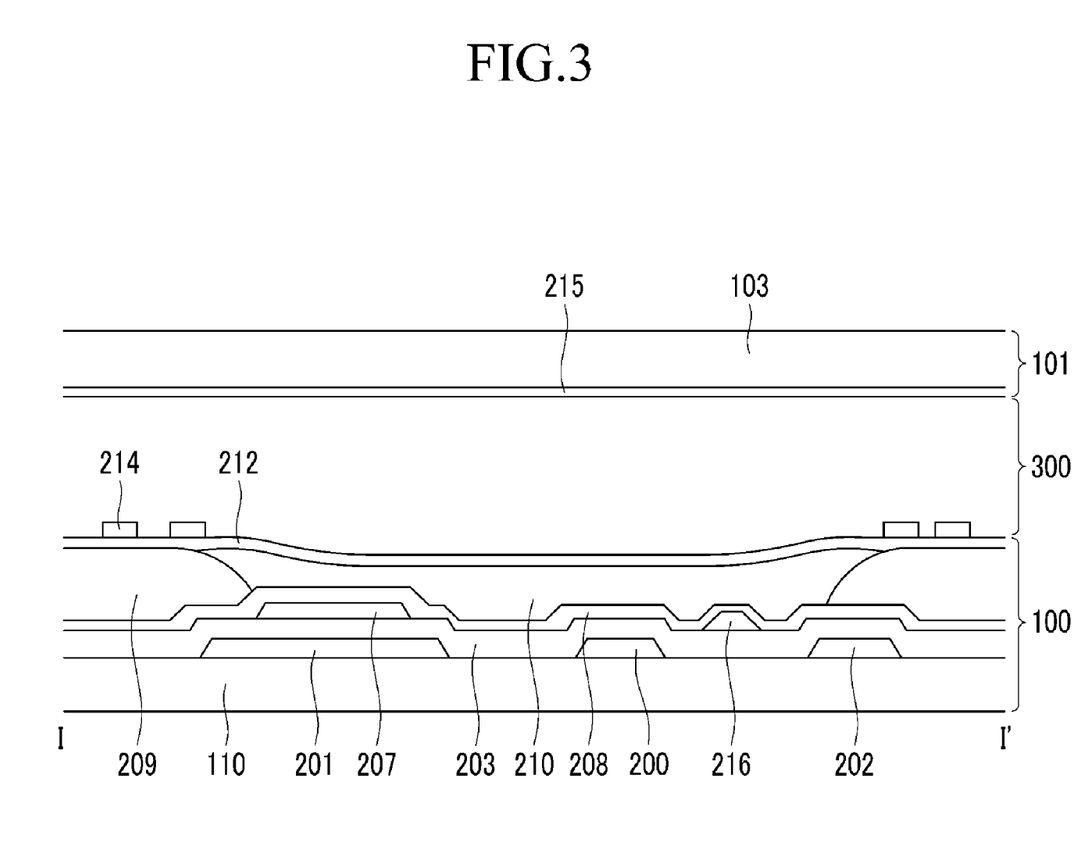
FIG. 3 is a cross-sectional view taken along line I-I' of FIG. 2.
Figure 4:
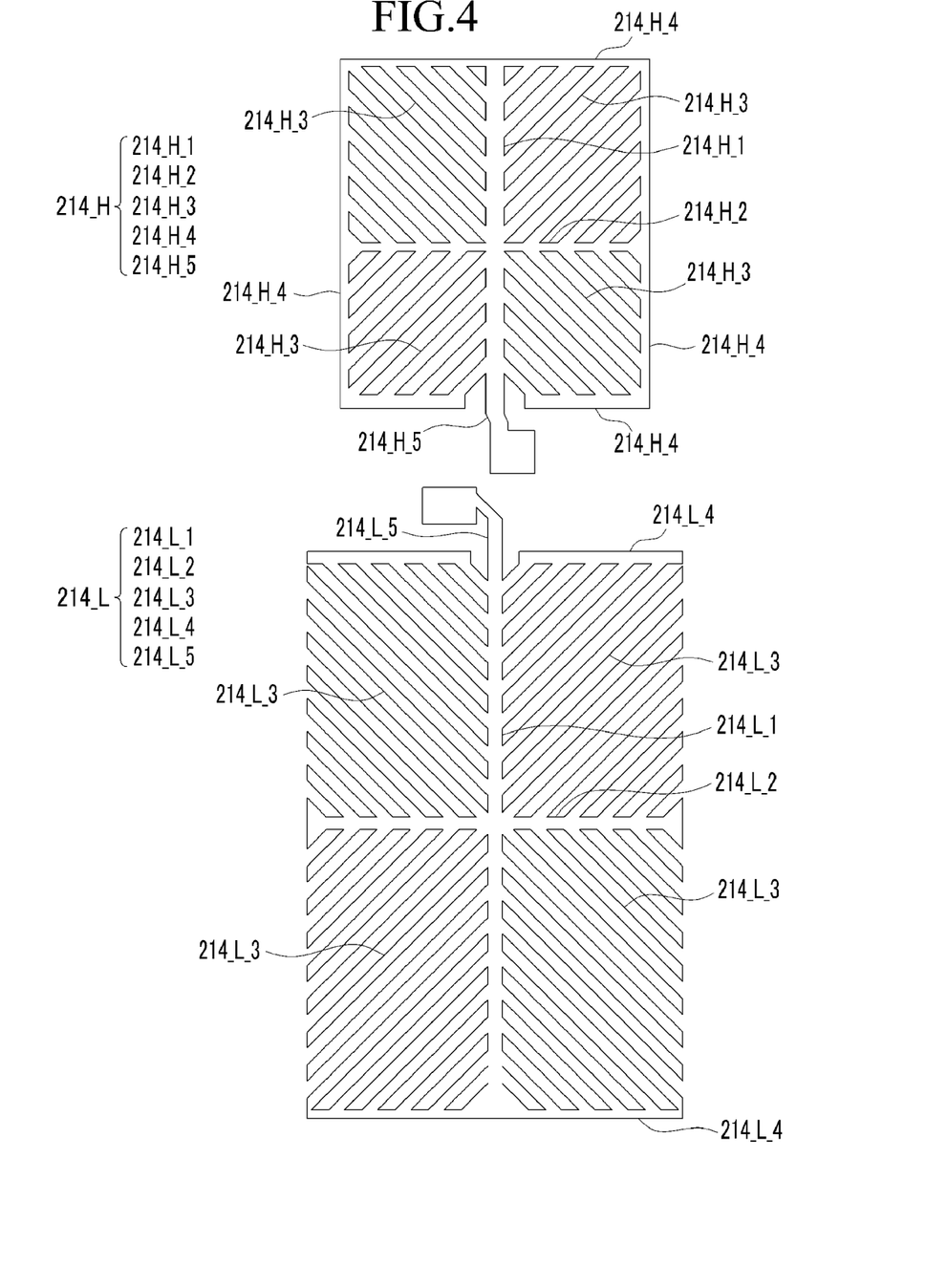
FIG. 4 is a top plan view showing only the exemplary embodiment of a pixel electrode in FIG. 2.

FIG. 2 is a top plan view of an exemplary embodiment of an LCD according to the present invention, FIG. 3 is a cross-sectional view taken along line I-I' of FIG. 2, and FIG. 4 is a top plan view showing only the exemplary embodiment of a pixel electrode in FIG. 2.

Next, a structure of an exemplary embodiment of an LCD according to the present invention will be described with reference to FIG. 2 to FIG. 4.

Firstly, the TFT array panel 100 will be described.

A first gate line 200, a common electrode line 201, and a second gate line 202 that are formed from a gate metal layer are formed on an insulation substrate 110, and a gate insulating layer 203 is formed on the signal lines 200, 201, and 202. Exemplary embodiments of the gate insulating layer 203 may be made of an inorganic material such as silicon nitride (SiNx) or other materials with similar characteristics.

Semiconductor patterns 401 and 402 are formed on the gate insulating layer 203, a data line 204 including a source electrode 205, first and second drain electrodes 206 and 216, and a step-down capacitor electrode 207 that are formed from a data metal layer are formed on the semiconductor patterns 401 and 402, and a passivation layer 208 is formed on the data line 204, the first and second drain electrodes 206 and 216, and the step-down capacitor electrode 207. Exemplary embodiments of the passivation layer 208 may be made of an inorganic material such as silicon nitride (SiNx) or other materials with similar characteristics.

In an exemplary embodiment wherein the display is a color display, a color filter 209 of red, green, and blue is formed on the passivation layer 208, and a light blocking layer 210 is formed on a portion of the passivation layer 208 where the color filter 209 is not formed. In FIG. 2, the color filter 209 and the blocking layer 210 are illustrated together. In the present exemplary embodiment, the light blocking layer 210 is disposed corresponding to the data line 204 and the first and second gate lines 200 and 202, the common electrode line 201, the first and second drain electrodes 206 and 216, and the step-down capacitor electrode 207. An overcoat 212 made of the inorganic insulating layer such as silicon nitride (SiNx) or other materials with similar characteristics is formed on the color filter 209 and the light blocking layer 210. Alternative exemplary embodiments also include configurations wherein the color filter 209 is disposed on the common electrode panel 101.

A pixel electrode 214 having a plurality of minute branches (hereinafter referred to as a minute branch pixel electrode) is formed on the overcoat 212, and the minute branch pixel electrode 214 may be made of a transparent conductive material, exemplary embodiments of which include indium tin oxide ("ITO"), indium zinc oxide ("IZO") or other materials with similar characteristics. The minute branch pixel electrode 214 includes the first sub-pixel electrode 214_H and the second sub-pixel electrode 214_L as illustrated in detail in FIG. 4, and they are respectively connected to the first drain electrode 206 and the second drain electrode 216 through contact holes 211 and 213 passing through the overcoat 212, the light blocking layer 210, and the passivation layer 208.

The minute branch pixel electrode 214 will be described in more detail with reference to FIG. 4. As shown in FIG. 4, the overall shape of the pixel electrode 214 is a quadrangle, and includes the two sub-pixel electrodes, i.e., the first sub-pixel electrode 214_H and the second sub-pixel electrode 214_L referred to previously. The first sub-pixel electrode 214_H includes a first cross-shaped stem including a first longitudinal stem 214_H_1 and a first transverse stem 214_H_2 that are disposed substantially perpendicular to one another. Also, beside the cross-shaped stem, the first sub-pixel electrode 214_H includes first minute branches 214_H_3 having four directions of extension, a first edge connection 214_H_4 connecting the edges of the first minute branches 214_H_3, and a first drain electrode connection 214_H_5 connecting the first drain electrode 206 and the first sub-pixel electrode 214_H. Generally, to prevent light leakage, the first edge connection 214_H_4 partially overlaps the light blocking layer 210. The first sub-pixel electrode 214_H receives the data voltage through the first drain electrode connection 214_H_5.

In the present exemplary embodiment, a portion of the first edge connection 214_H_4 near the position where the first edge connection 214_H_4 and the first drain electrode connection 214_H_5 would otherwise connect is removed. That is, the first edge connection 214_H_4 does not extend across the entire lower side of the first sub-pixel electrode 214_H. Accordingly, in this structure, the first edge connection 214_H_4 overlapping the light blocking layer 210 is divided into two sides with respect to the first drain electrode connection 214_H_5, and the two sides of the first edge connection 214_H_4 are separated from the first drain electrode connection 214_H_5 by a predetermined interval. The first edge connection 214_H_4 is connected to the first drain electrode connection 214_H_5 through the first minute branches 214_H_3. The first minute branches 214_H_3 extend from the first drain electrode connection 214_H_5 in a diagonal direction, and are connected to the first edge connection 214_H_4 overlapping the light blocking layer 210. Accordingly, the portion of the first drain electrode connection 214_H_5 that is not connected to the first minute branches 214_H_3 or the first edge connection 214_H_4 exists in the region outside the light blocking layer 210.

The second sub-pixel electrode 214_L includes a second cross-shaped stem including a second longitudinal stem 214_L_1 and a second transverse stem 214_L_2 that are disposed substantially perpendicular to one another. Also, beside the crossed shaped stem, the second sub-pixel electrode 214_L includes second minute branches 214_L_3 having four directions of extension, a second edge connection 214_L_4 connecting the edges of the second minute branches 214_L_3, and a second drain electrode connection 214_L_5 connecting the drain electrode 206 and the second sub-pixel electrode 214_L. The second sub-pixel electrode 214_L receives the data voltage through the second drain electrode connection 214_L_5.

In the second sub-pixel electrode 214_4 similar to the first sub-pixel electrode 214_H, the portion of the second edge connection 214_L_4 near the position where the second edge connection 214_L_4 and the second drain electrode connection 214_L_5 would otherwise connect is removed. That is, the second edge connection 214_L_4 does not extend across the entire upper side of the second sub-pixel electrode 214_L. Accordingly, in this structure, the second edge connection 214_L_4 overlapping the light blocking layer 210 is divided into two sides with respect to the second drain electrode connection 214_L_5, and the two sides of the second edge connections 214_L_4 are separated from the second drain electrode connection 214_L_5 by a predetermined interval. The second edge connection 214_L_4 is connected to the second drain electrode connection 214_L_5 through the second minute branches 214_L_3. The second minute branches 214_L_3 extend from the second drain electrode connection 214_L_5 in a diagonal direction and are connected to the second edge connection 214_L_4 overlapping the light blocking layer 210. Accordingly, the portion of the second drain electrode connection 214_L_5 that is not connected to the second minute branches 214_L_3 or the second edge connection 214_L_4 exists in the region outside the light blocking layer 210.

In the common electrode panel 101, a common electrode 215 is formed on an insulation substrate 103. As briefly discussed above, alternative exemplary embodiments include configurations wherein the color filter 209 is disposed on the common electrode panel 101.

A liquid crystal layer 300 is disposed between the common electrode panel 101 and the TFT array panel 100. Exemplary embodiments include configurations wherein the liquid crystal layer 300 may include liquid crystal molecules that are initially arranged substantially perpendicular to the two display panels 100 and 101.

Figure 5:
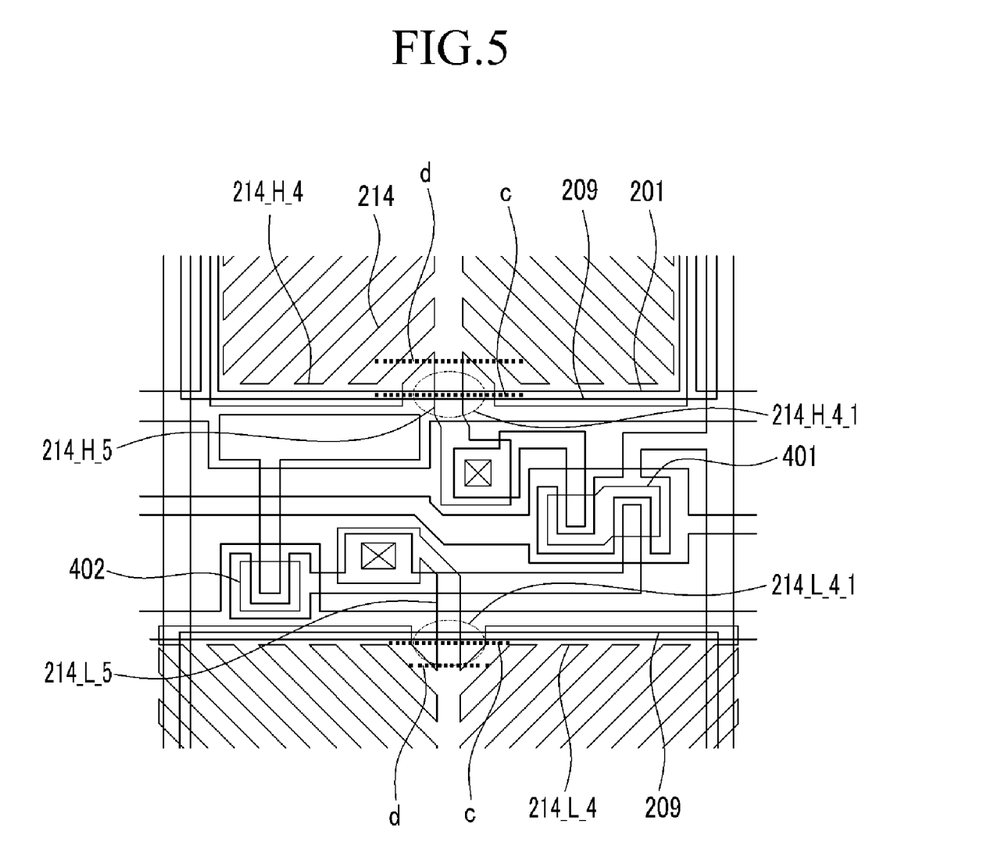
FIG. 5 is a top plan view showing an exemplary embodiment of a position where laser cutting occurs to repair a pixel defect in an exemplary embodiment of an LCD according to the present invention.

Next, a method of repairing a pixel defect in an exemplary embodiment of an LCD according to the present invention will be described with reference to FIG. 5.

To repair a pixel defect when the pixel shines during display of a black image, that is, a bright pixel defect in a black screen, the first drain electrode connection 214_H_5 or the second drain electrode connection 214_L_5 is cut by a laser in order for the pixel electrode to be floated, i.e., at a floating potential voltage, thereby to not be applied with the data voltage. According to an exemplary embodiment of the present invention, the first edge connection 214_H_4 overlapping the light blocking layer 210 is divided into individual sides with respect to the first drain electrode connection 214_H_5 in the first sub-pixel electrode 214_H, and the two sides of the first edge connection 214_H_4 are separated from the first drain electrode connection 214_H_5 by the predetermined interval. Also, the first minute branches 214_H_3 extend from the first longitudinal stem 214_H_1 in the diagonal direction, and are connected to the first edge connection 214_H_4 overlapping the light blocking layer 210. Accordingly, the portion of the first drain electrode connection 214_H_5 that is not connected to the first minute branches 214_H_3 or the first edge connection 214_H_4 exists in the region outside the light blocking layer 210. In this structure, if the laser is irradiated from an intersecting point "c" where the first drain electrode connection 214_H_5 and the boundary of the light blocking layer 210 meet each other to a position "d" where the first drain electrode connection 214_H_5 and the first longitudinal stem 214_H_1 meet each other (where the first minute branch 214_H_3 is started), the first drain electrode connection 214_H_5 is cut, and the data voltage is not applied to the other portions of the first sub-pixel electrode 214_H such that the bright pixel defect may be repaired.

In order to alleviate the bright pixel defect, if the laser is irradiated from an intersecting point c where the second drain electrode connection 214_L_5 and the boundary of the light blocking layer 210 meet to each other to a position d where the second drain electrode connection 214_L_5 and the second longitudinal stem 214_L_1 meet to each other (where the first second minute branch 214_L_3 is started), the second drain electrode connection 214_L_5 is cut, the data voltage is not applied to the other portions of the second sub-pixel electrode 214_L such that the bright pixel defect may be repaired.

In configurations where the first edge connection 214_H_4 is directly connected to the first drain electrode connection 214_H_5, differently than that illustrated in FIGS. 2 and 4, the light is blocked by the light blocking layer for all portions of the first drain electrode connection 214_H_5 before the position where the first edge connection 214_H_4 and the first drain electrode connection 214_H_5 meet each other such that it is difficult to locate the laser irradiation position and to repair the pixel defect.

The present invention also includes configurations wherein the pixel electrode is not divided in two sub-pixel electrodes.

A method for manufacturing an exemplary embodiment of an LCD will now be described.

Firstly, the first gate line 200, the common electrode line 201, and the second gate line 202, a gate insulating layer 203 covering these signal lines, semiconductor patterns 401 and 402 disposed on the gate insulating layer 203, a data line 204, the first and second drain electrodes 206 and 216, a step-down capacitor electrode 207, a passivation layer 208 covering the above, a color filter 209 and a light blocking layer 210 disposed on the passivation layer 208, an overcoat 212 covering them, and a minute branch pixel electrode 214 disposed on the overcoat 212 are formed through repeating a thin film deposition or coating process, and photolithography or a photoresistive process on an insulation substrate 110 to manufacture the TFT array panel 100.

Next, signals are applied to the signal lines of the TFT array panel 100 to inspect for pixel defects of the TFT array panel 100.

If a bright pixel defect is detected according to the inspection of the TFT array panel 100 as described above, the laser is irradiated in the region from the intersection portion "c" where the drain electrode connections 214_H_5 and 214_L_5 and the boundary of the light blocking layer 210 meet each other to the intersection point "d" where the drain electrode connections 214_H_5 and 214_L_5 and the first longitudinal stem 214_H_1 meet to each other to convert the bright pixel defect to a dark pixel for the repair.

Next, the TFT array panel 100 is assembled to the common electrode panel 101 manufactured through additional deposition processes to manufacture the LCD. The liquid crystal layer is formed between the TFT array panel 100 and the common electrode panel 101 through a drip method, an injection method or other similar methods.

Another exemplary embodiment of an LCD according to the present invention will now be described with reference to FIG. 6.

Figure 6:
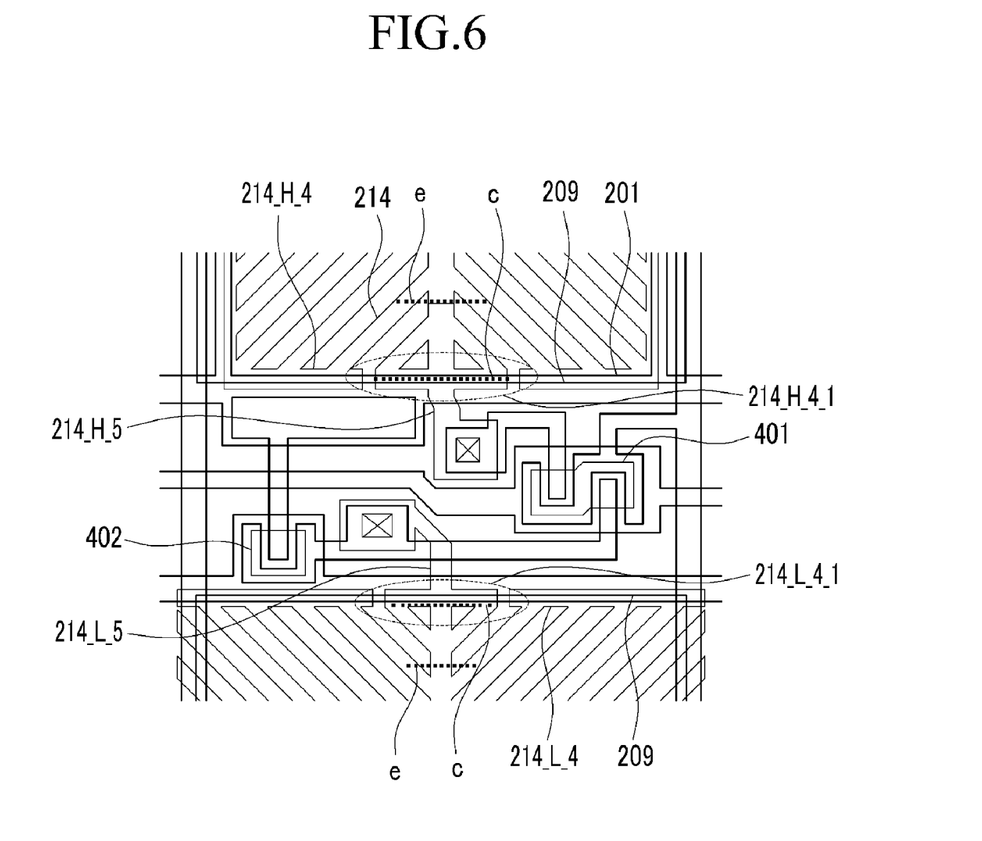
FIG. 6 is a top plan view showing another exemplary embodiment of a position where laser cutting occurs to repair a pixel defect in another exemplary embodiment of an LCD according to the present invention.

The exemplary embodiment of FIG. 6 is structurally similar to the exemplary embodiment of FIG. 2 to FIG. 5, however a removal position of the first edge connection 214_H_4 is different from the previous exemplary embodiment. That is, the first edge connection 214_H_4 is divided into an intersection portion where the first edge connection 214_H_4 is connected to the first drain electrode connection 214_H_5, and two portions that are separated from the intersection portion by a predetermined distance. Here, the intersection portion is connected to the first minute branch 214_H_3. Accordingly, among the first edge connection 214_H_4, the intersection portion and the first minute branch 214_H_3 form an isolated isosceles triangle, and the first drain electrode connection 214_H_5 passes through the central part thereof. In this structure, if the laser is irradiated at the region from the intersection point "c" where the first drain electrode connection 214_H_5 and the boundary of the light blocking layer 210 meet each other to the position "e" where the second first minute branch 214_H_3 is started such that the first drain electrode connection 214_H_5 and the first minute branch 214_H_3 are cut, the data voltage is not applied to the rest of the first sub-pixel electrode 214_H, thereby repairing the bright pixel defect.

The second sub-pixel electrode 214_L is divided into the intersection portion where the second edge connection 214_L_4 and the second drain electrode connection 214_L_5 are connected to each other, and two portions that are separated from the intersection portion by the predetermined distance. Here, the intersection portion is connected to the first second minute branch 214_L_3. Referring to a bright pixel defect of the second sub-pixel electrode 214_L, if the laser is irradiated at the region from the intersection point "c" where the second drain electrode connection 214_L_5 and the boundary of the light blocking layer 210 meet each other to the position "e" where the second the second minute branch 214_L_3 is started such that the second drain electrode connection 214_L_5 and the first 2 minute branch 214_L_3 are disconnected, the data voltage is not applied to the remaining portion of the second sub-pixel electrode 214_4 thereby repairing the bright pixel defect.

Another exemplary embodiment of an LCD according to the present invention will now be described with reference to FIG. 7.

Figure 7:
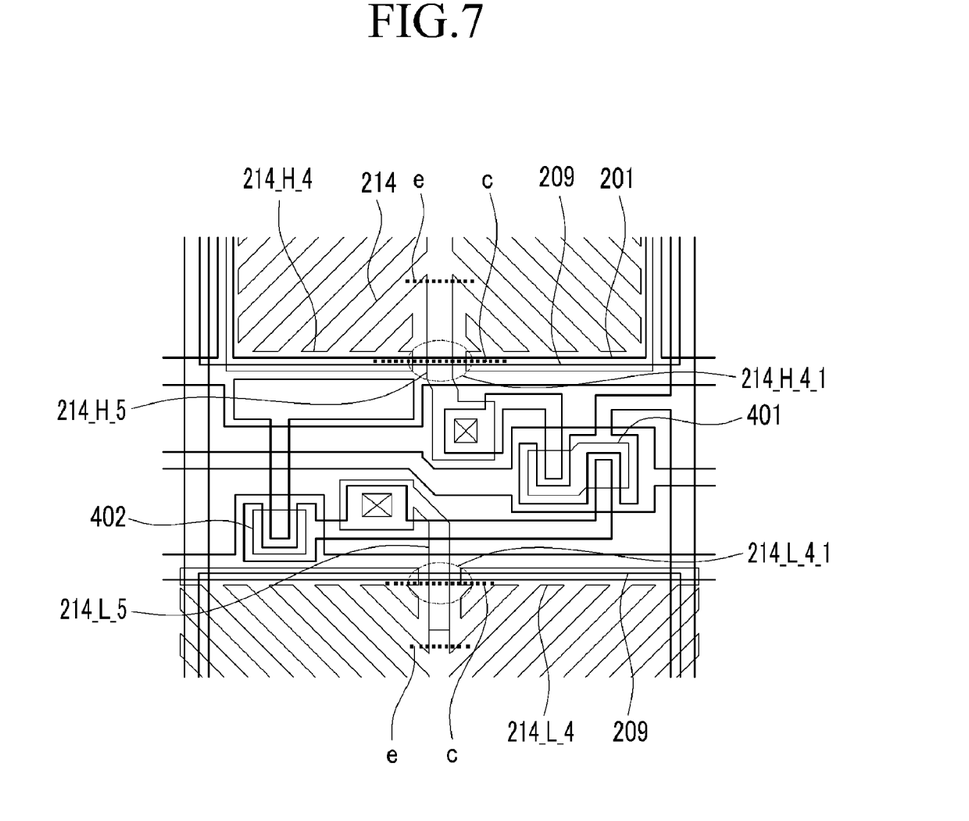
FIG. 7 is a top plan view of another exemplary embodiment of an LCD according to the present invention.

The exemplary embodiment of FIG. 7 is structurally similar to the exemplary embodiment of FIG. 2 to FIG. 5, and the first minute branch 214_H_3 and 214_L_3 nearest the intersection point "c" where the drain electrode connection 214_H_5 and 214_L_5 and the boundary of the light blocking layer 210 meet each other are separated from the drain electrode connection 214_H_5 and 214_L_5 and the stems 214_H_1 and 214_L_1. In this structure, if the laser is irradiated at the region from the intersection point "c" where the drain electrode connections 214_H_5 and 214_L_5, and the boundary of the light blocking layer 210 meet each other, respectively, to the position "e" where the second minute branches 214_H_3 and 214_L_3 are disconnected from the drain electrode connections 214_H_5 and 214_L_5, the data voltage is not applied to the remaining portions of the sub-pixel electrodes 214_H and 214_4 thereby repairing the bright pixel defect. Accordingly, the region that is capable of being irradiated by the laser for the repair is increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first insulation substrate;
a thin film transistor disposed on the first insulation substrate; and
a pixel electrode disposed on the first insulation substrate and connected to a drain electrode of the thin film transistor,
wherein the pixel electrode comprises:
a plurality of branches;
a stem which connects individual branches of the plurality of branches;
an edge connection which connects individual branches of the plurality of branches; and
a drain electrode connection which connects the stem and the drain electrode of the thin film transistor,
wherein the edge connection extends in a direction substantially perpendicular to the drain electrode connection, and includes two portions separated from opposing sides of the drain electrode connection such that a gap having a predetermined size is disposed between the two portions and the drain electrode connection.

2. The liquid crystal display of claim 1, wherein the drain electrode connection and a portion of the edge connection overlap a light blocking layer.

3. The liquid crystal display of claim 2, wherein the branches extend from the stem in a diagonal direction and are connected to the edge connection.

4. The liquid crystal display of claim 3, wherein the edge connection further includes an intersection portion connected to the drain electrode connection, and there are at most two positions where the intersection portion is connected to the plurality of branches.

5. The liquid crystal display of claim 3, wherein the branches on either side of the drain electrode nearest the position where the drain electrode connection and the boundary of the light blocking layer are aligned with each other among the plurality of branches are separated from the drain electrode connection and the stem.

6. The liquid crystal display of claim 2, wherein the branches on either side of the drain electrode nearest the position where the drain electrode connection and the boundary of the light blocking layer are aligned with each other among the plurality of branches are separated from the drain electrode connection and the stem.

7. The liquid crystal display of claim 1, wherein the edge connection further includes an intersection portion connected to the drain electrode connection, and there are at most two positions where the intersection portion is connected to the plurality of branches.

8. A liquid crystal display comprising:
a first insulation substrate;
a thin film transistor disposed on the first insulation substrate;
a pixel electrode disposed on the first insulation substrate and connected to a drain electrode of the thin film transistor; and
a light blocking layer which covers the thin film transistor, wherein the pixel electrode comprises:
a drain electrode connection connected to a drain electrode of the thin film transistor;
a stem connected to the drain electrode connection; and
a plurality of branches which extend from the stem in a diagonal direction,
wherein the drain electrode connection includes at least one outer line which forms an only passage between a remaining portion of the pixel electrode and the thin film transistor and wherein the outer line is disposed in
a region not covered by the light blocking layer.

9. A method for manufacturing a liquid crystal display, the method comprising:
providing a thin film transistor array panel comprising:
a first insulation substrate;
a thin film transistor disposed on the first insulation substrate; and
a pixel electrode disposed on the first insulation substrate and connected to a drain electrode of the thin film transistor,
wherein the pixel electrode comprises:
a plurality of branches;
a stem which connects the plurality of branches;
an edge connection which connects the plurality of branches; and
a drain electrode connection which connects the stem and the drain electrode of the thin film transistor,
wherein the edge connection extends in a direction substantially perpendicular to the drain electrode connection, and includes two portions separated from opposing sides of the drain electrode connection such that a gap having a predetermined size is disposed between the two portions and the drain electrode connection; and
irradiating a laser to a region corresponding to the portion of the drain electrode connection disposed in a region not covered by the light blocking layer to disconnect the drain electrode connection.

10. The method of claim 9, wherein
the edge connection further includes an intersection portion connected to the drain electrode connection, there are at most two positions where the intersection portion is connected to the plurality of branches, and
the laser is irradiated from a position where the boundary of the light blocking layer and the drain electrode connection meet each other to a position where the drain electrode connection and the stem meet each other.

11. The method of claim 10, wherein
the branches on either side of the drain electrode nearest the position where the drain electrode connection and the boundary of the light blocking layer are aligned with each other among the plurality of branches are separated from the drain electrode connection and the stem, and
the laser is irradiated from a position where the boundary of the light blocking layer and the drain electrode connection meet each other to a position where the drain electrode connection and the stem meet each other.

12. A method for manufacturing a liquid crystal display, the method comprising:
providing a thin film transistor array panel comprising:
a first insulation substrate;
a thin film transistor disposed on the first insulation substrate;
a pixel electrode disposed on the first insulation substrate and connected to a drain electrode of the thin film transistor; and
a light blocking layer covering the thin film transistor,
wherein the pixel electrode comprises:
a drain electrode connection connected to a drain electrode of the thin film transistor;
a stem connected to the drain electrode connection; and
a plurality of branches which extend from the stem in a diagonal direction,
wherein the drain electrode connection includes at least one outer line which forms an only passage between a remaining portion of the pixel electrode and the thin film transistor and is disposed in a region not covered by the light blocking layer; and
irradiating a laser to a region corresponding to the portion of the drain electrode connection disposed in a region not covered by the light blocking layer to disconnect the drain electrode connection.

* * * * *